United States Patent [19]

Suezaki et al.

[11] Patent Number: 5,834,549
[45] Date of Patent: Nov. 10, 1998

[54] TRANSPARENT CONDUCTIVE COATING COMPOSITION AND TRANSPARENT ANTISTATIC MOLDED ARTICLE

[75] Inventors: Minoru Suezaki, Takatsuki; Kouji Maruyama, Ibaraki; Takashi Ohsugi, Osaka-fu; Yoshio Nishimura, Osaki, all of Japan

[73] Assignee: Sekisui Chemical Co., Ltd., Osaka, Japan

[21] Appl. No.: 769,320

[22] Filed: Dec. 19, 1996

Related U.S. Application Data

[63] Continuation of Ser. No. 360,948, Dec. 21, 1994, abandoned.

[30] Foreign Application Priority Data

Dec. 22, 1993 [JP] Japan ................................. 5-324683
May 20, 1994 [JP] Japan ................................. 6-106683

[51] Int. Cl.$^6$ ................................................. C08K 3/10
[52] U.S. Cl. ........................ 524/409; 523/200; 523/210; 524/410; 524/423
[58] Field of Search ................................. 523/200, 210; 524/409, 410, 423

[56] References Cited

U.S. PATENT DOCUMENTS 4,657,835  4/1987  Yashiki ................................. 430/60

FOREIGN PATENT DOCUMENTS 0281365  9/1988  European Pat. Off. .

*Primary Examiner*—Edward J. Cain
*Attorney, Agent, or Firm*—Townsend & Banta

[57] ABSTRACT

A transparent conductive coating composition comprises a conductive powder (a) and a binder resin (b) containing (meth)acrylate compound as a main component. The composition may further comprise a dispersant (c), a photopolymerization initiator (d) or a titanium coupling agent (e). A transparent antistatic molded article is made of a substrate having a transparent conductive film comprising the transparent conductive coating composition described above.

3 Claims, No Drawings

TRANSPARENT CONDUCTIVE COATING COMPOSITION AND TRANSPARENT ANTISTATIC MOLDED ARTICLE

This application is a continuation of application Ser. No. 08/360,948, filed Dec. 21, 1994, now abandoned.

TECHNICAL FIELD

The present invention relates to a transparent conductive coating composition which can be easily set by active irradiation such as ultraviolet or visible radiation, to form a coating film superior in conductivity, transparency, marring resistance and hardness.

Further, the present invention relate to a trasparent antistatic molded article superior in marring resistance.

BACKGROUND OF THE INVENTION

Heretofore, materials having antistatic properties have been used for storage vessels for semiconductor wafers, electronic/electric parts, floor/wall coverings for a production factory of semiconductors, etc., wherein static electrification must be avoided.

In order to impart antistatic properties to a molded article of a synthetic resin, for example, there can be normally used a method of coating a molded article with a paint containing a carbon powder, metallic powder, etc., or a method of molding a molded article using a synthetic resin kneaded with a carbon powder, carbon fiber, metallic fiber, etc.

However, the above methods have a problem that a transparent molded article can not be obtained due to the paint and coloring of the molded article itself, and the content can not be seen through the molded article in case of application for the window part.

In order to solve the above problems, various trials have been made. For example, Japanese Laid-Open Patent Publication No. 58-91777 discloses a transparent paint comprising a conductive fine powder of tin oxide as a main component and a binder.

This paint can forms a coating film which is transparent: and has antistatic properties, however, the resulting coating film normally has low hardness because the binder is a thermoplastic resin, thereby, a coating film having excellent marring resistance and solvent resistance can not be obtained.

Further, Japanese Laid-Open Patent Publication No. 60-60166 discloses a transparent paint comprising a conductive fine powder of tin oxide as a main component and a photo-setting resin binder.

This paint contains a component which is set by ultraviolet or visible radiation. And the resulting coating film formed by using said paint is superior in transparency, marring resistance and solvent resistace, and has antistatic function.

This paint confers enough marring resistance on the substrate such as acrylic resin having comparative high surface-hardness, even if of the coating film is relatively thin, and maintains original transparency of said substrate.

However, there is a problem, in order to confer enough marring resistance on a substrate such as vinylchloride resin or polycarbonate having comparative low suface hardness, it is necessary to thicken the coating film, which results in deterioration of transparency of the resulting coating film.

SUMMARY OF THE INVENTION

The object of the present invention is to provide a transparent conductive coating composition superior in marring resistance, which can be made of not only a plastic substrate, such as acrylic resin, having comparative high suface-hardness, but also a plastic substrate, such as vinylchloride resin, polycarbonate, etc., having comparative low surface-hardness.

The another object of the present invention is to provide a transparent antistatic molded article having a transparent conductive film.

According to an embodiment of the present invention, there is provided a transparent conductive coating composition comprising a conductive powder (a) and a binder resin (b) containing (meth)acrylate compound as a main component.

According to another embodiment of the present invention, there is provided a transparent conductive coating composition comprising a conductive powder (a), a binder resin (b) containing (meth)acrylate compound as a main componennt, a dispersant (c) and a photopolymerzation initiator (d).

According to another embodiment of the present invention, there is provided a transparent conductive coating composition comprising a conductive powder (a), a binder resin (b) containing (meth)acrylate compound as a main component, a dispersant (c), a photopolymerzation initiator (d) and a titanium coupling agent (e).

According to another embodiment of the present invention, there is provided a transparent antistatic molded article made of a substrate having a transparent conductive film comprising any transparent conductive coating composition described above.

In the above embodiment of the present invention, the conductive powder (a) consists essentially of a barium sulfate particle coated with antimony oxide-containing tin oxide The barium sulfate particle has the same refraction index of 16 as that of the binder resin (b), so it never scatters a visible radiation. Further, the barium sulfate particle confers high transparency and generates conductivity by the antimony oxide-containing tin oxide coating thereof.

The particle size of the conductive powder (a) is generally limited to less than 0.4 µm. If the particle size is too small, the amount of the barium sulfate particles in the film is lowered when the transparent conductive film is relatively thick to have enough conductivity, which results in deterioration of transparency of the conductive film. On the other hand, if the particle size is too large, the surface smoothness of said film is lowered and generates many small openings between the particles, which results in deterioration of transparency of the conductive film. Therefore, the particle size of the conductive powder (a) according to the invention is within a range of 0.01 to 2 µm, preferably a range of 0.03 to 0.5 µm.

The average core diameter of the barium suflate particle is preferably 0.1 µm. The amount of the antimony oxide-conataining tin oxide in the particle is preferably 30 wt %.

The binder resin (b) used in the present invention mainly contains (meth)acrylate compound component having at least two (meth)acryloyl groups in a molecule, and examples thereof include bifunctional (meth)acrylates such as ethylene glycol di(meth)acrylate, diethylene glycol di(meth) acrylate, triethylene glycol di(meth)acrylate, tetraethylene glycol di(meth)acrylate, nonaethylene glycol di(meth) acrylate, polyethylene glycol di(meth)acrylate, tripropylene glycol di(meth)acrylate, tetrapropylene glycol di(meth) acrylate, nonapropylene glycol di(meth)acrylate, polypropylene glycol di(meth)acrylate, 2,2-bis[4-acryloxydiethoxy) phenyl]propane, 2,2-bis[4-(methacryloxydiethoxy) phenyl] propane, 3-phenoxy-2-propanoylacrylate, 1,6-bis(3-acryloxy-2-hydroxypropyl)hexyl ether, etc.; trifunctional (meth)acrylates such as pentaerythritol tri(meth)acrylate, trimethylolpropane tri(meth)acrylate, glycerol tri(meth) acrylate, tris(2-hydroxyethyl) isocyanurate (meth)acrylate, etc.; tetra (or more) functional (meth)acrylates such as pentaerythritol tetra(meth)acrylate, dipentaerythritol penta (meth)acrylate, dipentaerythritol hexa(meth)acrylate, etc.

Examples of the (meth)acrylate compound other than those described above include an acrylic urethane oligomer having a (meth)acryloyl group at a molecular terminal and a urethane bond in the molecule. When using the acrylic urethane oligomer, hardness and marring resistance of the resulting coating film is further improved. The (meth) acrylate compound may be used alone or in combination.

The ratio of the (meth)acrylate compound and the acrylic urethane oligomer is preferably 10:90 to 90:10 by weight. If the weight ratio of either component is too large or too small, marring resistance of the resulting coating film is deteriorated.

The acrylic urethane oligomer may be prepared by reacting a compound having at least two isocyanate groups in a molecule with (meth)acrylate having an active hydrogen.

Examples of said compound having at least two isocyanate groups in a molecule include m-phenylene diisocyanate, p-phenylene diisocyanate, toluene-2,4-diisocyanate, toluene-2,5-diisocyanate, toluene-2,6-diisocyanate, toluene-3,5-diisocyanate, m-xylylene diisocyanate, p-xylylene diisocyanate, hexamethylene diisocyanate, trimethylhexamethylene diisocyanate, isophorone diisocyanate, 4,4'-diphenylmethane diisocyanate, 4,4'-diisocyanate-3,3'-dimethylbiphenyl, 4,4'-diisocyanate-3,3'-dimethylbiphenylmethane and the like.

Examples of the (meth)acrylate having an active hydrogen include 2-hydroxyethyl (meth)acrylate, 2-hydroxypropyl (meth)acrylate, 3-hydroxypropyl (meth) acrylate, glycerin di(meth)acrylate, 1,6-bis(3-acryloxy-2-hydroxypropyl)hexyl ether, pentaerythritol tri(meth) acrylate, tris-(2-hydroxyethyl)isocyanurate (meth)acrylate, (meth)acrylic acid and the like.

In the transparent conductive coating composition of the present invention, if the amount of the binder resin (b) in the above conductive composition is too small, the cross-linking density is lowered, which results in deterioration of marring resistance and solvent resistance of the resulting coating film. On the other hand, if the amount is too large, the volume rate of the conductive powder (a) is comparatively small, which results in deterioration of conductivity of the resulting coating film. Therefore, the amount of the binder resin (b) is limited within a range of 5 to 70 parts by weight, based on 100 parts by weight of the conductive powder (a).

In order to make the conductive powder (a) disperse more uniformly in the conductive composition, a dispersant (c) may be added to the binding resin (b).

Examples of the dispersant (c) include anionic surfactant such as dialkylsulfosodiumsuccinate or alkylnaphthalenesodiumsulfonate, cationic surfactant such as stearyltrimethylammoniumchloride, ester surfactant such as solvitanmonostearate polyvinylacetal resin, etc.

Another example of the dispersant (c) may be a copolymer obtained by reacting 75 to 98 molar % of vinyl chloride or (meth)acrylate ester monomer described below in the formula (1),

($R^1$ denotes a hydrogen atom or a methyl group and $R^2$ denotes an alkyl or aryl group having a carbon number of 10 or less.), 2 to 25 molar % of vinylalcohol, monomer having hydroxyl group described below in the formula (2)

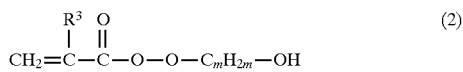

($R^3$ denotes a hydrogen atom or a methyl group and m denotes an integer of 1 to 10.) or monomer having hydroxyl group described below in the formula (3)

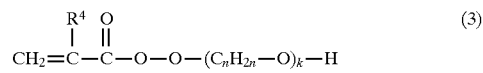

($R^4$ denotes a hydrogen atom or a methyl group, n denotes an integer of 1 to 9 and k denotes an integer of 2 to 10.) and 0 to 18 molar % of other copolymeric monomer.

Examples of the (meth)acrylate ester described above in the formula (1) include methyl (meth)acrylate, ethyl (meth) acrylate, propyl (meth)acrylate, n-butyl (meth)acrylate, n-hexyl (meth)aclylate, n-octyl (meth)acrylate, 2-ethylhexyl (meth)acrylate, phenyl (meth)acrylate, etc., and may contain halogenation (meth)acrylate ester such as 2-chrolethyl (meth)acrylate.

Examples of the monomer having hydroxyl group discribed above in the formula (2) include hydroxyethyl(meth) acrylate, hydroxypropyl(meth)acrylate, hydroxybutyl(meth) acrylate, hydroxyoctyl(meth)acrylate, etc.

The monomer having hydroxyl group discribed above in the fomula (3) include polyethylene glycol mono(meth) acrylate such as triethylene glycol mono(meth)acrylate, tetraethylene glycol mono(meth)acrylate, or polypropylene glycol mono(meth)acrylate such as tripropylene glycol mono(meth)acrylate, tetrapropylene glycol mono(meth) acrylate, etc.

Examples of the copolymeric monomer include styrene, α-methylstyrene, vinyl acetate, etc.

In the copolymer described above, when the amount of the vinylalcohol or monomer having a hydroxy group is too small, the conductive powder (a) cannot be dipersed uniformly, which results in deterioration of transparency of the resulting coating film. On the other hand, when the amount is too large, the solvent resistance becomes inferior. Therefore, the amount of the vinyl alcohol or monomer having a hydroxy group is limited to within a range of 2 to 25 molars, preferably a range of 5 to 20 molar %.

In said copolymer, when the amount of the other copolymeric monomer is too large, formation of the resulting coating film becomes inferior. Therefore, the amount of the copolymeric monomer is limited within a range of 0 to 18 molar %.

The polyvinyl acetal resin described above is prepared by subjecting polyvinyl alcohol and aldehyde to a condensation reaction to acetalize. In order to conduct acetalization, there can be used a known method, e.g. a precipitation method using an aqueous medium in the presence of an acid catalyst and a solution method using a solvent such as alcohol, etc.

The polyvinyl acetal resin can also be obtained by conducting saponification and acetalization at the same time, using polyvinyl acetate as a raw material.

Further, said polyvinyl acetal resin may contain vinyl acetate or vinylalcohol.

The amount of said vinyl acetate is preferably less than 10 molar %. If the amount of a vinyl alcohol is too small, the dispersion of the conductive powder (a) is insufficient, which results in deterioration of conductivity of the resulting coating film. On the other hand, if the amount is too large, solvent resistance of the resulting coating film becomes inferior. Therefore, the amount of a vinylalcohol is preferably within a range of 2 to 60 molar %, more preferably within a range of 5 to 40 molar %.

If the average polymerization degree of the polyvinyl alcohol is too small, it is hard to synthesize polyvinyl alcohol and viscosity of the coating composition becomes low, which results in deterioration of coating film. Therefore, it is preferred that the average polymerization degree of the polyvinyl alcohol is not less than 200.

Examples of the aldehyde include formaldehyde, acetaldehyde, propionaldehyde, butyraldehyde, amylaldehyde, hexylaldehyde, heptylaldehyde, octylaldehyde, 2-ethylhexylaldehyde, decylaldehyde, cyclohexylaldehyde and the like. The aldehyde may be used alone or in combination.

Further, the polyvinylacetal resin may be those in which an acetyl group remains in a hydroxyl group. The molar % of the residual acetyl group [the molar % of the ethylene group to which the acetoxy group is bonded, for the total ethylene groups (derived from a vinyl group of a raw monomer) constituting the main chain] is preferably not more than 10 molar %.

If the amount of the residual hydroxyl group in the polyvinylacetal resin is small, dispersion of the conductive powder (a) is insufficient. On the other hand, if the amount is too large, solvent resistance becomes inferior. Therefore, the amount of the residual hydroxyl group is preferably within a range of 2 to 60 molar %, more preferably within a range of 5 to 40 molar %.

In the conductive composition of the present invention, if the amount of the dispersant (c) is too small, the conductive powder (a) cannot be dispersed uniformly, which results in deterioration of transparency of the resulting coating film. On the other hand, if the amount is too large, hardness, marring resistance and solvent resistance become inferior. Therefore, the amount of the dispersant (c) is preferably within a range of 2 to 50 parts by weight based on 100 parts by weight of the conductive powder (a).

The photopolymerization initiator (d) used in the present; invention may be those which have properties of initiating polymerization by active irradiation such as ultraviolet or visible radiation.

Examples of the photopolymerization initiators (d) include sulfides such as sodium methyldithiocarbamate sulfide, diphenyl monosulfide, dibenzothiazoyl monosulfide, disulfide, etc.; thioxanthones such as thioxanthone, 2-ethylthioxanthone, 2-chlorothioxanthone, 2,4-diethylthioxanthone, etc.; azo compounds such as hydrazone, azobisisobutyronitrile, etc; benzenediazonium; diazo compounds; aromatic carbonyl compounds such as benzoin, benzoin methyl ether, benzoin ethyl ether, benzophenone, dimethylaminobenzophenone, Michler's ketone, benzylanthraquinone, t-butylanthraquinone, 2-methylanthraquinone, 2-ethylanthraquinone, 2-aminoanthraquinone, 2-chloroanthraquinone, etc.; dialkylaminobenzoates such as methyl-p-dimethylaminobenzoate, ethyl-p-dimethylaminobenzoate, butyl-p-dimethylaminobenzoate, isopropyl-p-diethylaminobenzoate, etc.; peroxides such as benzoyl peroxide, di-t-butyl peroxide, dicumyl peroxide, cumene hydroperoxide, etc.; acridines such as 9-phenylacridine, 9-p-methyoxyphenylacridine, 9-acetylaminoacridine, benzacridine, etc.; phenazines such as 9,10-dimethylbenzphenazine, 9-methylbenzphenazine, 10-methoxybenzphenazine, etc.; quinoxalines such as 6,4', 4"-trimethoxy-2,3-diphenylquinoxaline, etc.; 2,4,5-triphenylimidazoyl dimer, etc.

Examples of those activated by visible radiation include 2-nitrofluorence, 2,4,6-triphenylpyrylium tetrafluoroborate, 2,4,6-tris(trichloromethyl)-1,3,5-tri -azine, 3,3'-carbonylbiscumarin, Michler's thioketone and the like Tin oxide strongly absorbs ultraviolet radiation having a wavelength of 350 nm or less, and the degree of coloring becomes large in case of ultraviolet radiation having a wavelength of 400 nm or more. Therefore, the photopolymerization initiator (d) having a maximum absorption wavelength within a range of 350 to 400 nm is preferred in the present invention In order to prevent deterioration of sensitivity of the photopolymerization initiator (d) due to oxygen inhibition, an amine compound may be added to the coating composition of the present invention. The amine compound may be any compound which is non-volatile, but is not limited to aliphatic amines, aromatic amines and the like such as triethanolamine or methyldiethanolamine. Still more, a polymerization initiator having an amino group such as dialkylaminobenzoic ester or Michler's ketone described above, may be used as said amine compound.

In the conductive composition of the present invention, if the amount of the photopolymerization initiator (d) is too small, the polymerization reaction does not proceed so that hardness and marring resistance of the resulting coating film becomes insufficient. Further, even if the amount of the photopolymerization initiator (d) is larger than the predetermined amount, thickening effect is scarcely obtained. In addition, the coating film is set only at the surface thereof and complete setting can not be obtained. Therefore, the amount of the photopolymerization initiator (d) is preferably a range of 0.01 to 10 parts by weight based on 100 parts by weight of the conductive powder (a) and more preferably a range of 0.1 to 10 parts by weight, and a range of 0.01 to 20 parts by weight based on 100 parts by weight of (meth) acrylate compound and more preferably a range of 1 to 10 parts by weight.

The titanium coupling agent (e) used in the present invention may be a titanate compound which has properties of dispersing the conductive powder (a) in the (meth) acrylate compound or the organic solvent described below.

Examples of the titanate compound include isopropyltriisostearoyltitanate, tetraisopropylbis (dioctylphosphite)titanate, tetraoctylbis (ditridecylphosphite)titanate, tetra(2,2'-diaryloxymethyl-l-butyl)bis(ditridecyl)phosphitetitanate, isopropyltridecylbenzenesulfonyltitanate, bis (dioctylpyrophosphate)oxyacetatetitanate, bis (dioctylpyrophosphate)ethylenetitanate, isopropyltrioctanoyltitanate, isopropyldimethacrylisostearoyltitanate, isopropylisostearoyldiacryltitanate, isopropyltri (dioctylphosphate)titanate, isopropyltricumylphenyltitanate, isopropyltri(N-aminoethyl -aminoethyl)titanate and the like.

The titanium coupling agent (e) of the present invention is used in the condition of attaching on the surface of the conductive powder (a). One of the attaching method is the method of agitating the mixture of the organic solvent and the conductive powder (a), then dropping (math)acrylate compound into said mixture. Another method is the method of spraying the coupling agent on the surface of the conductive powder (a). Stil another method is the method of dissolving the titanium coupling agent (e) in the solvent, and mixing them with the conductive powder (a), then drying to eliminate said solvent.

In the coating composition, if the amount of the titanium coupling agent (e) is too small, dispersion of the conductive powder (a) is insufficient. On the other hand, if the amount is too large, the surface-hardness and marring resistance of the resulting coating film become inferior. Therefore, the amount of the titanium coupling agent (e) is preferably within a range of 0.1 to 10 parts by weight based on 100 parts by weight of the conductive powder (a).

If necessary, various additives such as UV absorbing agents, antioxidants, thermal polymerization inhibitors, leveling agents, surface modifiers, defoaming agent, etc., may be added to the conductive composition of the present invention.

Further, an organic solvent may be added to the transparent conductive composition in order to heighten the coating or sticking aptitude of the resulting coating film, in case of forming said film on the surface of a plastic plate.

In case of solvents having a low boiling point or high volatility, viscosity of the coating composition varies due to evaporation during coating. In case of solvents having a high boiling point, a long period of time is required for the drying process. Therefore, the boiling point is preferably in the range of 80° to 160° C.

Examples of the organic solvent include methylethyl ketone, methylisobutyl ketone, cyclohexanone, ethylene glycol monomethyl ether (methyl cellosolve), ethylene glycol monoethyl ether (ethyl cellosolve), butyl acetate, isopropyl acetate, anisole and the like. The organic solvent may be used alone or in combination.

The transparent conductive coating composition of the present invention is manufactured by known methods. For example, one method includes dissolving a binder resin in an organic solvent, then, mixing them with a conductive powder.

In case of using a dispersant and/or a titanium coupling agent, the manufacturing method may be a method of dissolving a binder resin in an organic solvent, then, mixing and dispersing a conductive powder, which is attached with the dispersant and/or the titanium coupling agent, in the above resulting solvent.

In case of using the photopolymerization initiator, the manufacturing method may be a method of dissolving a binder resin and a photopolymerization initiator in an organic solvent, then, mixing and dispersing a conductive powder (or the dispersant and/or the titanium coupling agent if necessary) in the above resulting solvent.

Further, the manufacturing method may be a method of dispersing a conductive powder attached with a titanium coupling agent in an organic solvent by adding the dispersant, then, mixing and dissolving the binder resin and photopolymersation initiator in the above resulting solvent.

In order to completely disperse the conductive powder (a) in a coating composition, specific equipment is not required. For example, a sand mill, a ball mill, an attritor, a high-speed rotary agitator, a three-roll mill and the like may be used.

The coating film is formed by coating the transparent conductive composition on a substrate by a known coating method, removing the organic solvent by volatilization, and setting the composition by irradiating active radiations such as ultraviolet or visible radiation. Examples of the coating methods include the spraying method, the bar coating method, the doctor blade method, the roll coating method, the dipping method, etc.

Examples of substrates on which the above conductive films may be applied include molded plastic plates, films, sheets or cabinets of synthetic resins such as polyvinyl chloride resin, polystyrene, polycarbonate, polymethylmethacrylate, acrylonitril/butadiene/styrene copolymer, etc., glass, ceramics and the like.

The light source for setting the above coating composition may be any one which has hitherto been known such as a high-pressure mercury vapor lamp, an ultra high-pressure mercury vapor lamp, a metal halide lamp and the like.

The light source described above may be a radiation such as electron-ray, X-ray, γ-ray and the like.

It is preferred that the resulting coating film may be surface-finished by buffing. By surface finishing, transparency of the coating film is improved. Further, the tin oxide powder, which is liable to be detached from the surface, can be removed and generation of dust from the conductive film during use of the substrate, to which the conductive film is coated is prevented. The surface finishing by buffing is suitable for the production of the semiconductor devices in which dust must be markedly avoided.

EXAMPLES

The following Examples and Comparative Examples further illustrate the present invention in detail but are not to be construed to limit the scope thereof. In the Examples and Comparative Examples, "parts" is by weight unless otherwise stated.

Examples 1, 2 and Comparative Examples 1, 2

Predetermined parts shown in Table 1 of dipentaerythritolhexaacrylate or pentaerythritoltriacrylate, 0.2 parts of hydroquinon, 4 parts of 2,4-diethylthioxanthone and 4 parts of ethyl-p-dimethylaminobenzoate was dissolved in the predetermined parts shown in Table 1 of ethylcellosolve or cyclohexanon, and they were charged in an attritor.

Then, predetermined parts shown in Table 1 of a conductive powder and a polyvinylacetal resin (a ratio of residual hydroxy groups in all hydroxy groups: 35 molar %; a polymerization degree: 2400) was added to the solution prepared by the arrangement described above, and the attritor was run for 10 hours to disperse each component.

The resulting coating composition was applied on a transparent polymethylmethacrylate resin (abbreviated to "PMMA" hereinafter), polyvinyl chloride resin and polycarbonate resin plate by using a bar coater so that a dry film thickness becomes 2 μm and 4 μm, followed by drying at 50° C. for 1 minutes.

Then, ultraviolet radiation from a high-pressure mercury vapor lamp was irradiated at an irradiation dose of 1800 mJ/cm$^2$ to form a set coating film. The surface of the resulting coating film was finished by buffing with a wool polishing cloth of 30 cm in diameter with rotating speed of 3000 rpm.

TABLE 1

|  | Example 1 | Example 2 | Comparative example 1 | Comparative example 2 |
|---|---|---|---|---|
| pentaerythritoltriacrylate | — | 100 | — | 100 |
| dipentaerythritolhexaacrylate | 100 | — | 100 | — |
| ethylcellosolve | 780 | — | 780 | — |
| cyclohexanon | — | 1400 | — | 1400 |
| conductive powder | 300*[1] | 400*[1] | 300*[2] | 400*[2] |
| polyvinylacetal resin | 27 | 30 | 27 | 30 |

Note
*[1] Barium sulfate coated with an antimony conaining-tin oxide, having an average particle diameter of 0.1 μm ("Pastran Type IV" manufactured by Mitsui Kinzoku Co., Ltd.)
*[2] Antimony containing-tin oxide powder having an average particle diameter of 0.02 μm ("T-1" manufactured by Mitsubishi Material Co., Ltd.)

Regarding the above resulting coating film obtained from the coating composition, the following measurement of physical properties was conducted respectively.

(1) Thickness of the film:

The resulting conductive coating composition was applied on one side of a plastic substrate by using a bar coater and further hot-air drying at 50° C. for 10 minutes. Then, ultraviolet radiation was irradiated at an irradiation dose of 1800 mJ/cm$^2$ to set the partially separated coating film.

(2) Surface intrinsic resistance of the film:

It was measured according to ASTM D257.

(3) Total light transmittance and haze of the coating film:

It was measured according to ASTM D1003.

(4) Pensil hardness of the coating film:

It was measured according to JIS K5400.

(5) Abrasion test of the film:

It was evaluated by subjecting a coating film to abrasion (100 cycles were repeated at a load of 1 kg/cm$^2$ using a steel wool #0000). The results are evaluated by number of scars on the surface of the film, classified to 5 stages: 1 . . . many scars, 2 . . . a considerable number of scars, 3 . . . a few scars, 4 . . . few scars, 5 . . . none scar.

The results were shown in Tables 2 to 5.

TABLE 2

| Substrate | PMMA | | Polyvinyl chloride resin | | Polycarbonate | |
|---|---|---|---|---|---|---|
| Thickness of the film | 2 μm | 4 μm | 2 μm | 4 μm | 2 μm | 4 μm |
| Surface intrinsic resistance (Ω/□) | 2.0 × 10$^9$ | 9.5 × 10$^7$ | 1.1 × 10$^9$ | 7.1 × 10$^7$ | 1.3 × 10$^9$ | 1.4 × 10$^8$ |
| Total light transmittance (%) | 86.1 | 82.2 | 81.7 | 76.7 | 84.6 | 80.1 |
| Haze (%) | 2.1 | 2.6 | 3.0 | 3.8 | 1.8 | 2.2 |
| Pencil hardness | 5H | 5H | H | H | B | HB |
| Abrasion test | 4 | 5 | 3 | 5 | 2 | 4 |

TABLE 3

| Substrate | PMMA | | Polyvinyl chloride resin | | Polycarbonate | |
|---|---|---|---|---|---|---|
| Thickness of the film | 2 μm | 4 μm | 2 μm | 4 μm | 2 μm | 4 μm |
| Surface intrinsic resistance (Ω/□) | 4.5 × 10$^7$ | 3.5 × 10$^6$ | 3.2 × 10$^7$ | 3.0 × 10$^5$ | 3.3 × 10$^7$ | 4.4 × 10$^6$ |
| Total light transmittance (%) | 84.2 | 81.1 | 80.1 | 75.1 | 82.6 | 78.2 |
| Haze (%) | 2.2 | 2.5 | 2.0 | 3.1 | 2.5 | 2.3 |
| Pencil hardness | 5H | 5H | H | H | B | HB |
| Abrasion test | 4 | 5 | 3 | 5 | 2 | 4 |

TABLE 4

| Substrate | PMMA | | Polyvinyl chloride resin | | Polycarbonate | |
|---|---|---|---|---|---|---|
| Thickness of the film | 2 μm | 4 μm | 2 μm | 4 μm | 2 μm | 4 μm |
| Surface intrinsic resistance (Ω/□) | 1.5 × 10$^9$ | 5.0 × 10$^7$ | 6.1 × 10$^8$ | 3.3 × 10$^7$ | 7.2 × 10$^8$ | 6.0 × 10$^7$ |
| Total light transmittance (%) | 74.3 | 61.4 | 70.5 | 57.8 | 73.0 | 59.9 |
| Haze (%) | 1.3 | 2.0 | 1.7 | 2.8 | 1.5 | 2.1 |
| Pencil hardness | 5H | 5H | H | H | B | HB |
| Abrasion test | 4 | 5 | 3 | 5 | 2 | 4 |

TABLE 5

| Substrate | PMMA | | Polyvinyl chloride resin | | Polycarbonate | |
|---|---|---|---|---|---|---|
| Thickness of the film | 2 μm | 4 μm | 2 μm | 4 μm | 2 μm | 4 μm |
| Surface intrinsic resistance (Ω/□) | 2.3 × 10$^7$ | 2.5 × 10$^5$ | 1.7 × 10$^7$ | 2.1 × 10$^6$ | 3.0 × 10$^7$ | 2.5 × 10$^5$ |
| Total light transmittance (%) | 70.3 | 55.2 | 67.1 | 54.4 | 69.4 | 56.4 |
| Haze (%) | 2.2 | 2.5 | 2.0 | 3.1 | 2.5 | 2.3 |
| Pencil hardness | 5H | 5H | H | H | B | HB |
| Abrasion test | 4 | 5 | 3 | 5 | 2 | 4 |

Example 3

A solution was prepared by dissolving 2 parts of isopropyltriisostearoyltitanate ("KR-TTS" manufactured by Aginomoto Co., Ltd.) in 130 parts of methyl cellosolve. And, under the condition of agitation, 100 parts of conductive powder of barium sulfate coated with an antimony oxide-containing tin oxide having an average particle size of 0.1 μm in diameter ("Pastran Type IV" manufactured by Mitsui Kinzoku Co., Ltd.) was added to the solution.

Further, 25 parts of dipentaerythritolhexaacrylate, 0.2 parts of hydroqinon, 1 part of diethylthioxanthone and 1 part of ethyl-p-dimethylaminobenzonate were added to the solution and the solution was charged in an attritor.

Then, under the condition of agitation, 10 parts of a polyvinylacetoacetal resin (polymerization degree: 2400°) containing 35 molar % of vinylalcohol as a component, was also added to the solution.

The resulting solution was agitated for 10 hours to disperse each component, and a transparent conductive coating composition was obtained.

The resulting coating composition was applied on a transparent acrylic resin (PMMA) plate by using a bar coater so that a dry film thickness becomes 3 μm, followed by drying at 50° C. for 10 minutes. Then, ultraviolet radiation from a high-pressure mercury vapor lamp was irradiated at an irradiation dose of 1800 mJ/cm$^2$ to form a set coating film. And, the surface of the resulting antistatic coating film was finished by buffing with a wool polishing cloth of 30 cm in diameter with a rotating speed of 3000 rpm.

Example 4

According to the same manner as that described in Example 3, except for replacing dipentaerythritolhexaacrylate with pentaerythritoltriacrylate, methyl cellosolve with cyclohexanone and isopropyltriisostearoyltitanate with tetraisopropylbis(dioctylphosphite)titanate ("KR-41B" manufactured by Aginomoto Co., Ltd.), a transparent conductive coating composition was prepared and an antistatic coaing film was obtaind. Further, the surface of the resulting coating film was finished by buffing.

Example 5

According to the same manner as that described in Example 3, except for changing the amount of dipentaerythritolhexaacrylate from 25 parts to 40 parts, a transparent conductive coating composition was prepared and an antistatic coating film was obtained. Further, the surface of the resulting coating film was finished by buffing.

Example 6

According to the same manner as that described in Example 3, except for changing the amount of dipentaerythritolhexaacrylate from 25 parts to 12 parts, a transparent conductive caoting composition was prepared and an antistatic coating film was obtained. Further, the surface of the resulting coating film was finished by buffing.

Comparative Example 3

According to the same manner as that described in Example 3, except for replacing the conductive powder with the barium sulfate particles coated with an antimony oxide-containing tin oxide having an average particle size of 0.02 μm in diameter ("T-1" manufactured by Mitsubishi Material Co., Ltd.), a transparent conductive coating composition was prepared and an antistatic coating film was obtained. Further, the surface of the resulting coating film was finished by buffing.

Comparative Example 4

According to the same manner as that described in Example 3, except for adding no isopropyltriisostearoyltitanate, a transparent conductive coating composition was prepared and an antistatic coating film was obtained. Further, the surface of the resulting coating film was finished by buffing.

Comparative Example 5

According to the same manner as that described in Example 3, except for adding no dipentaerythritolhexaacrylate, a transparent conductive coating composition was prepared and an antistatic coating film was obtaind. Further, surface of the resulting coating film was finished by buffing.

Comparative Example 6

According to the same manner as that described in Example 3, except for changing the amount of dipentaerythritolhexaacrylate to 25 parts to 55 parts, a transparent conductive coating composition was prepared and an antistatic coating film was obtained. Further, the surface of the resulting coating film was finished by buffing.

Regarding the above resulting antistatic coating film obtained from Examples 3 to 6 and Comparative Examples 3 to 6, the following measurement of physical properties was conducted respectively in the same manner as in Example 1 and so on.

The results are shown in Table 6.

TABLE 6

|  | Examples | | | | Comparative examples | | | |
| --- | --- | --- | --- | --- | --- | --- | --- | --- |
| Substrate | 3 | 4 | 5 | 6 | 3 | 4 | 5 | 6 |
| Surface intrinsic resistance (Ω/□) | $2 \times 10^7$ | $2 \times 10^7$ | $3 \times 10^7$ | $1 \times 10^7$ | $5 \times 10^7$ | $2 \times 10^7$ | $3 \times 10^7$ | $1 \times 10^5$ or more |
| Total light transmittance (%) | 85.9 | 85.3 | 84.9 | 83.1 | 61.4 | 86.1 | 84.8 | 83.1 |
| Haze (%) | 1.9 | 2.0 | 2.0 | 2.0 | 2.0 | 3.1 | 5.7 | 4.2 |
| Abrasion test | 5 | 5 | 5 | 4 | 5 | 4 | 1 | 5 |

Example 7

A solution prepared by dissolving 33 parts of dipentaerythritolhexaacrylate, 1 part of diethylthioxanthone and 1 part of ethyl-p-dimethylaminobenzoate in 260 parts of methyl cellosolve, was charged in an attritor. And, under the condition of agitation, 100 parts of conductive powder of barium sulfate coated with an antimony oxide-containing tin oxide having an average particle size of 0.45 μm in diameter ("Pastran Type IV" manufactured by Mitsui Kinzoku Co., Ltd.) and 5 parts of oleic acid were added to the solution. And, the resulting solution was agitated for 6 hours to disperse each component, and a transparent conductive coating composition was prepared.

The resulting conductive coating composition was applied on one side of a transparent acrylic resin (PMMA) plate having a thickness of 3 μm by using a bar coater and further hot-air drying at 50° C. for 10 minutes. Then, ultraviolet radiation from a high-pressure mercury vapor lamp was irradiated at an irradiation dose of 1800 mJ/cm² to form a set coating film. And, surface of the resulting antistatic coating film was finished by buffing with a wool polishing cloth of 30 cm in diameter with rotating speed of 3000 rpm.

Further, according to the same manner as that described above, forming a transparent conductive film on another side of a transparent acrylic resin plate, then a transparent antistatic plate was obtained.

Example 8

According to the same manner as that described in Example 7, except for replacing the transparent acryl resin plate with a transparent vinylchloride resin plate (thickness: 3 mm), a transparent antistatic plate was obtained.

Example 9

According to the same manner as that described in Example 7, except for replacing the transparent acrylic resin plate with a transparent polycarbonate resin plate (thickness: 3 mm), a transparent antistatic plate was obtained.

Example 10

A solution prepared by dissolving 30 parts of dipentaerythritolhexaacrylate, 1 part of diethylthioxanthone and 1 part of ethyl-p-dimethylaminobenzoate in 260 parts of methyl sellosolve, was charged in an attritor. And, under the condition of agitation, 100 parts of conductive powder of barium sulfate coated with an antimony oxide-containing tin oxide having an average particle size of 0.45 μm in diameter ("Pastran Type IV" manufactured by Mitsui Kinzoku Co., Ltd.) and 9 parts of a butyral resin (a residual hydroxyl group: 35 molar %; a polymerization degree: 1700) were added to the solution.

The resulting solution was agitated for 6 hours to disperse each component and prepared a transparent conductive coating composition.

Further, according to the same manner as that described in Example 7, the resulting conductive coating composition was applied on both sides of a transparent acrylic resin plate (thickness: 3 mm) and a transparent antistatic plate was obtained.

Example 11

According to the same manner as that described in Example 10, except for replacing the transparent acrylic resin plate with a transparent vinylchloride resin plate, a transparent antistatic plate was obtained (thickness 3 mm).

Example 12

According to the same manner as that described in Example 10, except for replacing the transparent acrylic

Example 13

A solution prepared by dissolving 30 parts of dipentaerythritolhexaacrylate, 1 part of diethylthioxanthone and 1 part of ethyl-p-dimethylaminobenzoate in 300 parts of cyclohexanone, was charged in an attritor. And, under the condition of agitation, 100 parts of conductive powder of barium sulfate coated with an antimony oxide-containing tin oxide having an average particle size of 0.45 $\mu$m in diameter ("Pastran Type IV" manufactured by Mitsui Kinzoku Co., Ltd.) and 10 parts of a acetoacetal resin (residual hydroxyl groups: 35 molar %; a polymerization degree; 2400) were added to the solution. The resulting above solution was agitated for 8 hours to disperse each component, and prepared a transparent conductive coating composition was prepared.

Further, according to the same manner as that described in Example 7, the resulting conductive coating composition was applied on both sides of a transparent acrylic resin plate (thickness: 3 mm) and a transparent antistatic plate was obtained.

Example 14

According to the same manner as that described in Example 13, except for replacing the transparent acrylic resin plate with a transparent vinylchloride resin plate (thickness: 3 mm), a transparent antistatic plate was obtained.

Example 15

According to the same manner as that described in Example 13, except for replacing the transparent acrylic resin plate with a transparent polycarbonate resin plate (thickness: 3 mm), a transparent antistatic plate was obtained.

Example 16

A solution prepared by dissolving 28 parts of dipentaerythritolhexaacrylate, 1 part of diethylthioxanthone and 1 part of ethyl-p-dimethylaminobenzoate in a mixed solvent of 150 parts of methylethylketone and 150 parts of ethyl cellosolve, was charged in an attritor. Under the condition of agitation, 100 parts of conductive powder of barium sulfate coated with an antimony oxide-containing tin oxide having an average particle size of 0.45 $\mu$m in diameter ("Pastran Type IV" manufactured by Mitsui Kinzoku Co., Ltd.) and 10 parts of a copolymer ("Eslec E-HA" manufactured by Sekisui Chemical Co., Ltd.) of vinylchloride (90 molar %) and hydroxypropylacrylate (10 molar %), were added to the solution. The resulting solution was agitated for 6 hours to disperse each component and prepared a transparent conductive coating composition.

Further, according to the same manner as that described in Example 7, the resulting conductive coating composition was applied on both sides of a transparent acrylic resin plate (thickness: 3 mm) and a transparent antistatic plate was obtained.

Example 17

According to the same manner as that described in Example 16, except for replacing the transparent acrylic resin plate with a transparent vinylchloride resin plate (thickness: 3 mm), a transparent antistatic plate was obtained.

Example 18

According to the same manner as that described in Example 16, except for replacing the transparent acrylic resin (PMMA) plate with a transparent polycarbonate resin plate (thickness: 3 mm), a transparent antistatic plate was obtained.

Example 19

A solution prepared by dissolving 20 parts of dipentaerythritolhexaacrylate, 10 parts of pentaerythritoltetraacrylate, 1 part of benzophenone and 1 part of p-dimethylaminoacetophenone in a mixed solvent of 150 parts of methylethylketone and 150 parts of cyclohexanone, was charged in an attritor. Under the condition of agitation, 100 parts of conductive powder of barium sulfate coated with an antimony oxide-containing tin oxide having an average paticle size of 0.45 $\mu$m in diameter ("Pastran Type IV" manufactured by Mitsui Kinzoku Co., Ltd.) and 10 parts of a copolymer of methylmethacrylate (80 molar %) and 2-hydroxyethylacrylate (20 molar %), were added to the solution. The resulting solution was agitated for 6 hours to disperse each component and a tansparent conductive coating composition was prepared.

Further, according to the same manner as that described in Example 7, the resulting conductive coating composition was applied on both sides of a transparent acrylic resin plate (thickness: 3 mm) and a transparent antistatic plate was obtained.

Example 20

According to the same manner as that described in Example 19, except for replacing the transparent acrylic resin plate with a transparent vinylchloride resin plate (thickness: 3 mm), a transparent antistatic plate was obtained

Example 21

According to the same manner as that described in Example 19, except for replacing the transparent acrylic resin plate with a transparent polycarbonate resin plate (thickness: 3 mm), a transparent antistatic plate was obtained.

Comparative Example 7

According to the same manner as that described in Example 7, except for replacing the conductive powder with the barium sulfate particles coated with an antimony oxide-containing tin oxide having an average particle size of 2.3 $\mu$m in diameter, a transparent conductive film was formed on. the surface of a substrate and a transparent antistatic plate was obtained.

Comparative Example 8

According to the same manner as that described in Example 7, except for replacing the transparent acrylic resin plate with a transparent vinylchloride resin plate (thickness: 3 mm), a transparent antistatic plate was obtained.

Comparative Example 9

According to the same manner as that described in Example 7, except for replacing the transparent acrylic resin plate with a transparent polycarbonate resin plate (thickness: 3 mm), a transparent antistatic plate was obtained.

Comparative Example 10

According to the same manner as that described in Example 7, except for replacing the conductive powder with antimony oxide-containing tin oxide powder having a first order particle size of 0.02 μm in diameter ("T-1" manufactured by Mitsubishi Material Co., Ltd.), a transparent conductive film was formed on the surface of a substrate and a transparent antistatic plate was obtained.

Comparative Example 11

According to the same manner as that described in Example 10, except for replacing the transparent acrylic resin plate with a transparent vinylchloride resin plate (thickness: 3 mm), a transparent antistatic plate was obtained.

Comparative Example 12

According to the same manner as that described in Example 10, except for replacing the transparent acrylic resin plate with a transparent polycarbonate resin plate (thickness: 3 mm), a transparent antistatic plate was obtained.

Comparative Example 13

According to the same manner as that described in Example 7, except for changing the amount of dipentaerythritolhexaacrylate from 33 parts to 8 parts, a transparent conductive film was formed on a substrate and a transparent antistatic plate was obtained.

Comparative Example 14

According to the same manner as that described in Example 13, except for replacing the transparent acrylic resin plate with a transparent vinylchloride resin plate (thickness: 3 mm), a transparent antistatic plate was obtained.

Comparative Example 15

According to the same manner as that described in Example 13 except for replacing the transparent acrylic resin plate with a transparent polycarbonate resin plate (thickness: 3 mm), a transparent antistatic plate was obtained.

Comparative Example 16

According to the same manner as that described in Example 7, except for changing the amount of dipentaerythritolhexaacrylate from 33 parts to 70 parts, a transparent conductive film was formed on a substrate and a transparent antistatic plate was obtained.

Comparative Example 17

According to the same manner as that described in Example 16, except for replacing the transparent acrylic resin plate with a transparent vinylchloride resin plate (thickness: 3 mm), a transparent antistatic plate was obtained.

Comparative Example 18

According to the same manner as that described in Example 16, except for replacing the transparent acrylic resin (PMMA) plate with a transparent polycarbonate resin plate (thickness: 3 mm), a transparent antistatic plate was obtained.

Regarding the above resulting antistatic coating film obtained from Examples 7 to 21 and Comparative Examples 7 to 18, the following measurement of physical properties was conducted respectively in the same manner as in Example 1 and so on.

Further, the half-value period of static on the film was measured using a static-honest meter.

The results are shown in Tables 7 to 11.

TABLE 7

| | Examples | | | | | |
|---|---|---|---|---|---|---|
| | 7 | 8 | 9 | 10 | 11 | 12 |
| Substrate | PMMA | PVC | FC | PMMA | PVC | PC |
| Thickness of the film (μm) | 2 | 3 | 4 | 2 | 3 | 4 |
| Surface intrinsic resistance (Ω/□) | $8.8 \times 10^6$ | $1.0 \times 10^6$ | $4.1 \times 10^6$ | $1.0 \times 10^7$ | $1.7 \times 10^5$ | $4.6 \times 10^6$ |
| Total light transmittance (%) | 84.2 | 73.5 | 72.2 | 84.7 | 72.9 | 74.1 |
| Haze (%) | 1.4 | 2.0 | 1.8 | 1.2 | 1.8 | 2.0 |
| Half-value period of static on the film (second) | non-static | non-static | non-static | non-static | non-static | non-static |
| Abrasion test | 5 | 5 | 5 | 5 | 5 | |

Note
PMMA: polymethylmethacrylate resin
PVC: Polyvinylchloride resin
PC: Polycarbonate

TABLE 8

| | Examples | | | | | |
|---|---|---|---|---|---|---|
| | 13 | 14 | 15 | 16 | 17 | 18 |
| Substrate | PMMA | PVC | PC | PMMA | PVC | PC |
| Thickness of the film (μm) | 2 | 3 | 4 | 2 | 3 | 4 |
| Surface intrinsic resistance (Ω/□) | $4.7 \times 10^6$ | $1.4 \times 10^6$ | $5.0 \times 10^6$ | $8.0 \times 10^6$ | $2.1 \times 10^6$ | $4.3 \times 10^6$ |
| Total light transmittance (%) | 86.5 | 71.7 | 71.9 | 84.7 | 74.2 | 73.1 |
| Haze (%) | 1.3 | 1.9 | 1.9 | 1.1 | 1.9 | 1.7 |
| Half-value period of static on the film (second) | non-static | non-static | non static | non-static | non-static | non-static |
| Abrasion test | 5 | 5 | 5 | 5 | 5 | 5 |

Note
PMMA: polymethylmethacrylate resin
PVC: Polyvinylchloride resin
PC: Polycarbonate

TABLE 9

| | Examples | | |
|---|---|---|---|
| | 19 | 20 | 21 |
| Substrate | PMMA | PVC | PC |
| Thickness of the film (μm) | 2 | 3 | 4 |
| Surface intrinsic resistance (Ω/□) | $6.5 \times 10^6$ | $2.0 \times 10^6$ | $7.0 \times 10^6$ |
| Total light transmittance (%) | 84.4 | 72.2 | 72.2 |
| Haze (%) | 1.5 | 2.1 | 1.8 |
| Half-value period of static on the film (second) | non-static | non-static | non-static |
| Abrasion test | 5 | 5 | 5 |

Note
PMMA: polymethylmethacrylate resin
PVC: Polyvinylchloride resin
PC: Polycarbonate

TABLE 10

|  | Comparative examples | | | | | |
| --- | --- | --- | --- | --- | --- | --- |
|  | 7 | 8 | 9 | 10 | 11 | 12 |
| Substrate | PMMA | PVC | PC | PMA | PVC | PC |
| Thickness of the film ($\mu$m) | 2 | 3 | 4 | 2 | 3 | 4 |
| Surface intrinsic resistance ($\Omega/\square$) | $2.2 \times 10^{10}$ | $4.1 \times 10^{7}$ | $2.0 \times 10^{7}$ | $1.2 \times 10^{7}$ | $1.7 \times 10^{5}$ | $5.4 \times 10^{5}$ |
| Total light transmittance (%) | 78.7 | 69.5 | 67.1 | 72.9 | 60.6 | 55.6 |
| Haze (%) | 10.1 | 14.3 | 14.1 | 1.6 | 2.3 | 2.2 |
| Half-value period of static on the film (second) | non-static | non-static | non-static | non-static | non-static | non-static |
| Abrasion test | 5 | 5 | 5 | 5 | 5 | 5 |

Note
PMMA: polymethylmethacrylate resin
PVC: Polyvinylchloride resin
PC: Polycarbonate

TABLE 11

|  | Examples | | | | | |
| --- | --- | --- | --- | --- | --- | --- |
|  | 13 | 14 | 15 | 16 | 17 | 18 |
| Substrate | PMMA | PVC | PC | PMMA | PVC | PC |
| Thickness of the film ($\mu$m) | 2 | 3 | 4 | 2 | 3 | 4 |
| Surface intrinsic resistance ($\Omega/\square$) | $2.1 \times 10^{5}$ | $1.5 \times 10^{5}$ | $1.2 \times 10^{5}$ | $>10^{12}$ | $7.0 \times 10^{11}$ | $4.0 \times 10^{11}$ |
| Total light transmittance (%) | 80.6 | 71.3 | 70.6 | 85.9 | 72.9 | 72.6 |
| Haze (%) | 4.1 | 5.8 | 6.3 | 1.7 | 2.2 | 2.0 |
| Half-value period of static on the film (second) | non-static | non-static | non-static | 200 | 150 | 130 |
| Abrasion test | 2 | 1 | 1 | 5 | 5 | 5 |

Note
PMMA: polymethylmethacrylate resin
PVC: Polyvinylchloride resin
PC: Polycarbonate

We claim:

1. A transparent conductive coating composition comprising 100 parts by weight of a conductive barium sulfate powder coated with an antimony oxide-containing tin oxide, having a particle size of 0.01 to 2 $\mu$m, 5 to 70 parts by weight of a binder resin containing (meth)acrylate compound as a main component, having at least two (meth)acryloyl groups in a molecule, 2 to 50 parts by weight of a polyvinylacetal resin, 0.01 to 10 parts by weight of a photopolymerization initiator, 500 to 3000 parts by weight of an organic solvent and 0.1 to 10 parts by weight of a titanium coupling agent.

2. A transparent antistatic molded article comprising a transparent conductive coating film formed on the surface of a substrate, wherein said transparent conductive coating film comprises a transparent conductive coating composition which comprises 100 parts by weight of a conductive barium sulfate powder coated with an antimony oxide-containing tin oxide, having a particle size of 0.01 to 2 $\mu$m, 5 to 70 parts by weight of a binder resin containing (meth)acrylate compound as a main component, having at least two (meth)acryloyl groups in a molecule, 2 to 50 parts by weight of a polyvinylacetal resin, 0.01 to 10 parts by weight of a photopolymerization initiator, 500 to 3000 parts by weight of an organic solvent and 0.1 to 10 parts by weight of a titanium coupling agent.

3. A transparent antistatic molded ariticle according to claim 2, wherein said transparent said transparent conductive coating film is formed on a substrate comprising a material selected from molded plastic plates, films, sheets and cabinets.

* * * * *